US006667127B2

(12) United States Patent
Beattie et al.

(10) Patent No.: US 6,667,127 B2
(45) Date of Patent: Dec. 23, 2003

(54) FLUID DIFFUSION LAYERS FOR FUEL CELLS

(75) Inventors: Paul D. Beattie, Port Moody (CA); David P. Wilkinson, North Vancouver (CA); Paul Kozak, Mission (CA); Haijiang Wang, Burnaby (CA); Sheilah Neumann, Vancouver (CA); John Robert Gordon, Vancouver (CA); Kelvin Keen-Ven Fong, Burnaby (CA); Sonia Geillis Wong-Cheung, Burnaby (CA); Michael Todd Davis, Port Coquitlam (CA); Bien Chiem, Burnaby (CA); Lynn C. Erickson, Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 237 days.

(21) Appl. No.: 09/951,655

(22) Filed: Sep. 13, 2001

(65) Prior Publication Data

US 2002/0058180 A1 May 16, 2002

Related U.S. Application Data

(63) Continuation-in-part of application No. 09/662,437, filed on Sep. 15, 2000.

(51) Int. Cl.[7] .................................................. H01M 8/04
(52) U.S. Cl. ............................. 429/44; 429/34; 429/39
(58) Field of Search ............................... 429/12, 34, 35, 429/38, 39, 44; 423/445 R; 264/137

(56) References Cited

U.S. PATENT DOCUMENTS

| 4,851,304 A | * | 7/1989 | Miwa et al. ................ 429/40 |
| 5,181,979 A | * | 1/1993 | Uemura et al. ........... 156/89.26 |
| 5,219,674 A | | 6/1993 | Singelyn et al. ............... 429/36 |
| 5,380,606 A | | 1/1995 | Itou et al. ..................... 429/194 |
| 5,578,255 A | * | 11/1996 | Okuyama et al. ........... 264/29.5 |
| 6,037,073 A | | 3/2000 | Besmann et al. .............. 429/34 |
| 6,039,823 A | * | 3/2000 | Grasso et al. ............. 156/89.26 |

FOREIGN PATENT DOCUMENTS

| EP | 0 957 129 | 11/1999 |
| JP | 59-186265 | 10/1984 |

* cited by examiner

*Primary Examiner*—Carol Chaney
(74) *Attorney, Agent, or Firm*—McAndrews, Held & Malloy, Ltd.

(57) ABSTRACT

Fluid diffusion layers with favorable mechanical and electrical properties are prepared for fuel cell electrodes by impregnating a porous carbonaceous web with a carbonizable polymer having pyrrolidone functionality and then carbonizing the pyrrolidone polymer. The polymer having pyrrolidone functionality is stabilized against vaporization by use of an oxidization step prior to carbonization. The fluid diffusion layers are particularly suitable for use as gas diffusion layers in solid polymer electrolyte fuel cells.

42 Claims, 1 Drawing Sheet

FIG. 1

FLUID DIFFUSION LAYERS FOR FUEL CELLS

CROSS-REFERENCE TO RELATED APPLICATION(S)

This application is a continuation-in-part of U.S. patent application Ser. No. 09/662,437 filed on Sep. 15, 2000. The '437 application is incorporated herein by reference in its entirety.

FIELD OF THE INVENTION

The present invention relates to fluid diffusion layers for fuel cells and in particular to gas diffusion layers for solid polymer electrolyte fuel cells. Further, it relates to the use of carbonized polymers containing pyrrolidone groups in the manufacture of fluid diffusion layers.

BACKGROUND OF THE INVENTION

Fuel cells convert reactants, namely fuel and oxidants, to generate electric power and reaction products. Fuel cells generally employ an electrolyte disposed between two electrodes, namely a cathode and an anode. A catalyst typically induces the desired electrochemical reactions at the electrodes. Preferred fuel cell types include solid polymer electrolyte fuel cells that comprise a solid polymer electrolyte and operate at relatively low temperatures.

During normal operation of a solid polymer electrolyte fuel cell, fuel is electrochemically oxidized at the anode catalyst, typically resulting in the generation of protons, electrons, and possibly other species depending on the fuel employed. The protons are conducted from the reaction sites at which they are generated, through the electrolyte, to electrochemically react with the oxidant at the cathode catalyst. The catalysts are preferably located at the interfaces between each electrode and the adjacent electrolyte.

A broad range of fluid reactants can be used in solid polymer electrolyte fuel cells and may be supplied in either gaseous or liquid form. For example, the oxidant stream may be substantially pure oxygen gas or a dilute oxygen stream such as air. The fuel may be, for example, substantially pure hydrogen gas, a gaseous hydrogen-containing reformate stream, or an aqueous liquid methanol mixture in a direct methanol fuel cell. Reactants are directed to the fuel cell electrodes and are distributed to catalyst therein through fluid diffusion layers. In the case of gaseous reactants, these layers are referred to as gas diffusion layers.

Solid polymer electrolyte fuel cells employ a membrane electrode assembly ("MEA") which comprises the solid polymer electrolyte or ion-exchange membrane disposed between the two electrodes. Each electrode comprises an appropriate catalyst, preferably located next to the solid polymer electrolyte. The catalyst may, for example, be a metal black, an alloy or a supported metal catalyst such as platinum on carbon. The catalyst may be disposed in a catalyst layer, and a catalyst layer typically contains ionomer, which may be similar to that used for the solid polymer electrolyte (for example, Nafion®). The catalyst layer may also contain a binder, such as polytetrafluoroethylene. The electrode may also contain a substrate (typically a porous, electrically conductive sheet material) that may be employed for purposes of mechanical support and/or reactant distribution, thus serving as a fluid diffusion layer.

The MEA is typically disposed between two plates to form a fuel cell assembly. The plates act as current collectors and provide support for the adjacent electrodes. The fuel cell assembly is typically compressed to ensure good electrical contact between the plates and the electrodes, in addition to good sealing between fuel cell components. A plurality of fuel cell assemblies may be combined in series or in parallel to form a fuel cell stack. In a fuel cell stack, a plate may be shared between two adjacent fuel cell assemblies, in which case the plate also serves as a separator to fluidly isolate the fluid streams of the two adjacent fuel cell assemblies.

Flow fields are employed for the purpose of directing reactants across the surfaces of the fluid diffusion electrodes or electrode substrates. Flow fields are disposed on each side of the MEA and comprise fluid distribution channels. The channels provide passages for the distribution of reactants to the electrode surfaces and also for the removal of reaction products and depleted reactant streams. The flow fields may be incorporated in the current collector/support plates on either side of the MEA (in which case the plates are known as flow field plates) or, alternatively, may be integrated into the fluid distribution layers of the electrodes.

The fluid distribution layers in such fuel cells may therefore have several functions, typically including: to provide access of the fluid reactants to the catalyst, to provide a pathway for removal of fluid reaction products, to serve as an electronic conductor between the catalyst layer and an adjacent flow field plate, to serve as a thermal conductor between the catalyst layer and an adjacent flow field plate, to provide mechanical support for the catalyst layer, and to provide mechanical support and dimensional stability for the ion-exchange membrane.

Preferably, the fluid distribution layers are thin, lightweight, inexpensive, and readily prepared using mass production techniques (for example, reel-to-reel processing techniques). Materials which have been employed in fluid distribution layers for solid polymer electrolyte fuel cells include commercially available carbon fiber paper and woven and/or non-woven carbon fabrics. However, the mechanical and/or electrical properties of these materials alone may not be adequate to meet all the requirements for fuel cell applications.

Consequently, appropriate fillers and/or coatings have been employed in the art to improve one or more of these properties. For instance, the electrical conductivity of a carbonaceous web might be increased by filling with an electrically conductive filler such as graphite particles plus a binder. (Carbonaceous in this context simply means containing carbon.) Alternatively, the stiffness of a carbonaceous web might be increased by impregnating the web with a suitable amount of curable polymer and then curing the polymer. Further, both stiffness and conductivity might be increased by impregnating the web with a carbonizable polymer, followed by carbonization of the polymer-impregnated web in an inert atmosphere. "Carbonization" is defined herein as increasing the proportion of carbon by heating to temperatures of 600° C. or greater in a nonoxidizing environment. During carbonization, carbon proportion increases as hydrogen, oxygen and nitrogen are evolved. The carbonization product remaining after carbonization can provide both mechanical support and additional electrical pathways throughout the web. Carbonization product means the reaction product after carbonization. Specific examples of webs filled with a binder include the thin, highly porous, non-woven carbon fiber web products of Technical Fibre Products Ltd., which typically comprise non-woven carbon fiber webs bound with a styrene-acrylic binder. While offering many desirable features, such products may not be sufficiently stiff for handling purposes nor of sufficient electrical conductivity for desired fuel cell performance. The styrene-acrylic binder present in the web is neither conductive nor carbonizable. However, both stiffness and conductivity of such webs may be suitably improved by impregnating with a carbon particle filler and a phenol-formaldehyde resin. The resin is then cured and carbonized leaving behind a substantial amount of carbonization product and resulting in a stiffer, more conductive web.

Phenol-formaldehyde resins have been commonly used in many impregnation applications. The phenol-formaldehyde resin is typically diluted in a carrier solvent and then used as an impregnant for fluid diffusion layers. However, a disadvantage of phenol-formaldehyde resins is that the uncured resin and by-products during curing are toxic as are certain preferred carrier solvents. Thus appropriate precautions must be taken when using these materials. Water can be used as a carrier solvent to some extent. However, in situations where one wishes to also add a conductive filler to the fluid diffusion layer, the preferable method of application is by applying an ink to the web, where the ink comprises the conductive filler, the resin, and the carrier solvent. Such an ink usually requires a relatively large amount of carrier solvent. If water is used as the carrier solvent in an ink, the water is present in an amount large enough to cause the resin to precipitate out of the ink. Thus, when using a water carrier solvent for a phenol-formaldehyde resin, a two step impregnation process is generally employed. An ink comprising the conductive filler is used in a first impregnation step and then a water/resin ink is added in a second step.

U.S. Pat. No. 6,037,073 employs a phenolic resin in its preparation of a combination bipolar plate/diffuser component. The combination component is prepared by making and screening an aqueous slurry mixture of carbon fibers (such as chopped or milled carbon fibers of various lengths) and about 20 wt % to about 50 wt % phenolic resin powder binder to produce a wet monolithic, which is subsequently dried at less than 80° C. The dried monolith is further densified and resin-cured via mechanical compression in shaped graphite molds at about 120 to about 160° C., and carbonized at about 700 to about 1300° C. in an inert environment. A hermetic region on one side of the fluid diffusion layer is then achieved via conventional masking and chemical vapor infiltration (CVI) techniques. The porous region defines at least portions of reactant channels and the hermetic region contains coolant channels and prevents transport of fuel or oxidant to the wrong electrode of the fuel cell. U.S. Pat. No. 6,037,073 is incorporated by reference herein in its entirety.

Other carbonizable polymers may be considered for use in preparing fluid diffusion layers in a like manner to phenol-formaldehyde resins. For instance, polyacrylonitrile (PAN) polymers may seem to be a suitable choice since carbonizing processes are commonly used to make carbon products, such as carbon fiber webs from PAN polymers. In these processes, PAN is oxidatively stabilized prior to carbonization in order to obtain a substantial yield from the carbonizing. However, the PAN residue is extremely brittle and thus is not preferred for fluid diffusion layer applications. Additionally, toxic organic solvents are generally needed as carrier solvents.

Polymers having relatively low yields following conventional carbonization would typically be considered unsuitable for purposes of preparing fluid diffusion layers in this way. Pyrrolidone polymers, for instance, have typically provided relatively low yields following conventional carbonization.

SUMMARY OF THE INVENTION

An improved fluid diffusion layer for a fuel cell electrode comprises a porous carbonaceous web impregnated with a carbonization product of at least one polymer having pyrrolidone functionality. An improved fluid diffusion layer may comprise a plurality of porous carbonaceous webs impregnated with and bound together by a carbonization product of at least one polymer having pyrrolidone functionality. Pyrrolidone functionality is defined and discussed below. In the present context, "impregnated" means contained within, and the impregnated fluid diffusion layer does not require that all pores or voids are completely filled; in fact, it is specifically contemplated herein that the present fluid diffusion layers are impregnated but may still have substantial porosity. For example, the fluid diffusion layer preferably is at least about 50% porous. In the present context, the web impregnated with a carbonization product will preferably be made by impregnating the web with a carbonizable polymer having pyrrolidone functionality, followed by carbonization.

It has been found that polymers having pyrrolidone functionality are preferred carbonizable impregnants in the preparation of fluid diffusion layers for fuel cell electrodes. Similar to phenol-formaldehyde resins, carbonizable impregnants having pyrrolidone functionality can significantly improve the mechanical and electrical properties of certain porous carbonaceous webs for fuel cell applications. However, carbonizable impregnants having pyrrolidone functionality offer advantages in that a sufficient amount can be impregnated using water as a carrier solvent in a single impregnation step. The yield of carbonization product obtained from the impregnant having pyrrolidone functionality may be significantly increased by oxidizing the impregnant having pyrrolidone functionality prior to carbonization. Further, neither of the impregnant having pyrrolidone functionality or the water carrier solvent pose toxicity problems during impregnation.

The present method includes making a fluid diffusion layer for a fuel cell electrode that includes impregnating a porous carbonaceous web with a polymer and carbonizing the polymer wherein the polymer has pyrrolidone functionality.

An improved fluid diffusion layer can comprise a porous carbonaceous web, a non-particulate carbon filler, and a carbonization product of at least one polymer having pyrrolidone functionality, wherein the carbonization product binds the non-particulate carbon filler to the web. An improved fluid diffusion layer can comprise at least one porous carbonaceous web impregnated with a carbonization product of at least one polymer having pyrrolidone functionality, and the fluid diffusion layer defines at least one fluid distribution channel.

The present method also includes making a fluid diffusion layer by (a) coating a porous carbonaceous web with a mixture comprising a carbonizable polymer having pyrrolidone functionality; (b) disposing a non-particulate carbon filler in the coating of carbonizable polymer; and (c) carbonizing the carbonizable polymer so that the carbonization product binds the non-particulate carbon filler to the web.

As yet another aspect, a method of making a fluid diffusion layer defining a flow field is provided. The method comprises the steps of (a) impregnating at least one porous carbonaceous web with a polymer having pyrrolidone functionality, (b) carbonizing the polymer having pyrrolidone functionality to form a carbonization product, thereby forming a fluid diffusion layer having first and second major surfaces; and (c) forming at least one fluid distribution channel on the first major surface of the fluid diffusion layer.

Polymers having pyrrolidone functionality are derived from monomers containing a pyrrolidone functional group.

Such monomers are represented by the following general chemical formula:

where X represents chemical groups suitable for polymerization, such as for example, alkenyl groups. For example, X is a vinyl group in N-vinyl-2-pyrrolidone monomer.

In principle, the web may be impregnated with a monomer having pyrrolidone functionality that is polymerized in the web thereafter. A preferred polymer is polyvinylpyrrolidone, although other polymers (or suitable monomers) with pyrrolidone functional groups may be employed.

Polymers having pyrrolidone functionality vary widely in structure and include homopolymers of N-vinyl-2-pyrrolidone, and copolymers formed by polymerizing two or more polymerizable monomers, at least one of which provides pyrrolidone functionality. The term "pyrrolidone functionality" means the presence of one or more pendant pyrrolidone rings.

The polymer having pyrrolidone functionality can be a homopolymer of N-vinyl-2-pyrrolidone or a copolymer of N-vinyl-2-pyrrolidone with one or more ethylenically-unsaturated copolymerizable monomers. The pendant pyrrolidone rings of the polymer can be substituted or unsubstituted. For example, it may be advisable to employ pyrrolidone rings substituted with alkyl, alkenyl, or other groups.

In the method, the polymer may be dissolved in a solvent and then applied in solution to the carbonaceous web. For environmental and other reasons, a preferred solvent is water.

The impregnated polymer is preferably stabilized before carbonizing. The stabilization step may increase the carbon yield after carbonization. This stabilization may be accomplished by heating the polymer in an oxidizing atmosphere at a temperature below about 420° C. before carbonizing. Then, the carbonizing may be performed in an inert atmosphere at a temperature above about 600° C.

The method is suitable for preparing fluid diffusion layers for various fuel cell embodiments operating either on gaseous or liquid reactants. However, the method is particularly suitable for preparing gas diffusion layers for use in solid polymer electrolyte fuel cell electrodes.

In the preparation of a fuel cell electrode from the fluid diffusion layer, an appropriate catalyst may be applied to the fluid diffusion layer either before or after the carbonizing step. Further, catalyst may be applied in a mixture which also comprises the carbonizable polymer having pyrrolidone functionality.

The carbonaceous webs employed in the present method are preferably non-woven carbon fiber mats comprising carbon fibers and a binder. The binder may be any suitable material including styrene-acrylic or even the carbonizable polymer having pyrrolidone functionality.

The method is particularly suitable for preparing acceptable fuel cell fluid diffusion layers using lightweight carbonaceous webs that are greater than about 80% porous, less than about 250 micrometers thick, and have a weight per unit area less than about 100 g/m² (although materials with higher weights per unit area may also be suitable).

It may be advantageous to effect additional improvements (for example, improved electrical conductivity) by additionally incorporating carbon particles or non-particulate carbon filler (such as chopped carbon fibers) into the impregnated web. Suitable carbon particles include graphite particles, and they may be incorporated in a fill mixture comprising carbon particles and the carbonizable polymer having pyrrolidone functionality. Alternatively, it may be advantageous to incorporate non-particulate carbon filler as part of the fluid diffusion layer. Such a filler need not "fill" the porous carbonaceous web but may be disposed on a surface of such a web. The non-particulate carbon filler can be chopped carbon fibers. A fill mixture may comprise non-particulate carbon filler and/or carbon particles and a carbonizable polymer having pyrrolidone functionality. The fill mixture may also comprise a suitable pore former, such as methyl cellulose.

Through such methods, lightweight carbonaceous webs may be stiffened such that their Taber stiffness is greater than about 2 Taber units in the processing direction, or machine direction, of the porous carbonaceous web. Further, the electrical conductivity of such webs may be increased to be greater than about 1 $(ohm-cm)^{-1}$. The Gurley air permeability of the web however may be kept below about 20 seconds.

The present methods are suitable for preparing fluid diffusion layers for various fuel cell embodiments operating either on gaseous or liquid reactants. However, the methods are particularly suitable for preparing gas diffusion layers for use in solid polymer electrolyte fuel cell electrodes.

A method is also provided for preparing a fluid diffusion layer that defines one or more fluid distribution channels. For instance, a fluid diffusion layer can be made in accordance with the present techniques to be suitably thick to facilitate the formation of fluid distribution channels by embossing or other suitable means.

DETAILED DESCRIPTION OF PREFERRED EMBODIMENT(S)

Figure 1:
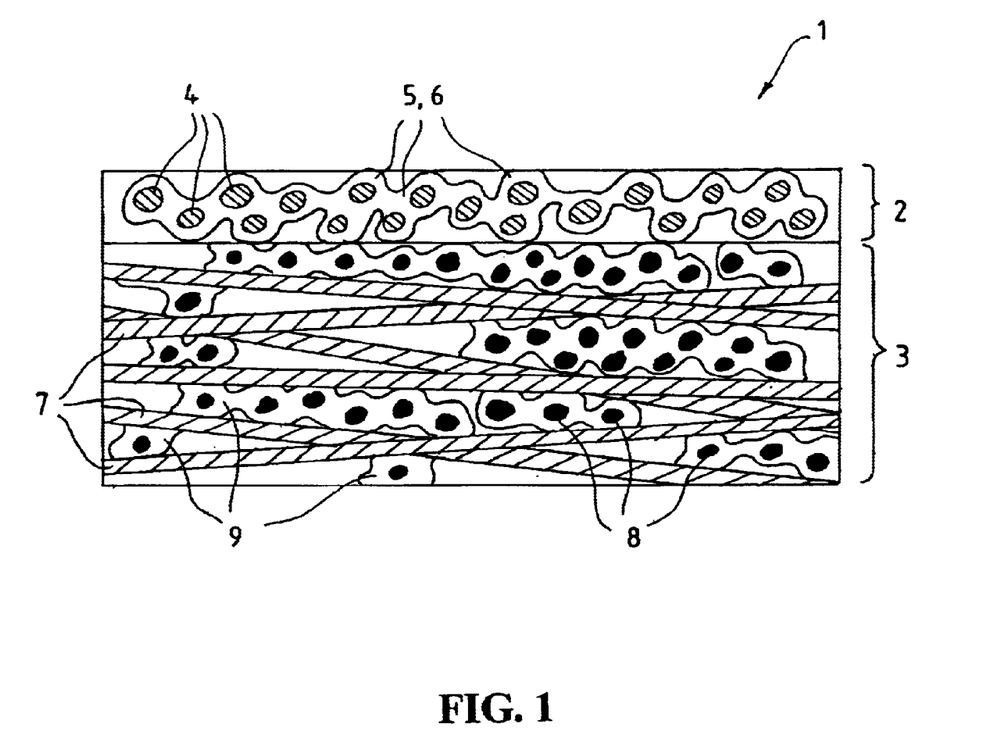
FIG. 1 is a schematic view of an electrode comprising a fluid diffusion layer for a solid polymer electrolyte fuel cell.

FIG. 1 illustrates an electrode 1 for a typical solid polymer electrolyte fuel cell that has been prepared using the present method. Electrode 1 comprises catalyst layer 2 and fluid diffusion layer 3. While FIG. 1 shows the catalyst layer 2 and the fluid diffusion layer 3 as distinct layers, they may also overlap to various extents. In this embodiment, catalyst layer 2 comprises carbon-supported catalyst particles 4 along with ionomer 5 and polytetrafluoroethylene (PTFE) binder 6, both of which are dispersed around catalyst particles 4. The use of binder 6 and/or ionomer 5 is optional. Furthermore, an ionomer 5 and a binder 6 need not be used simultaneously. Fluid diffusion layer 3 comprises non-woven carbon fiber mat 7, graphite particle filler 8, and carbonized polyvinylpyrrolidone (PVP) 9, which is dispersed around fiber mat 7 and graphite filler 8. Fluid diffusion layer 3 may optionally include ionomer (not shown) and/or PTFE binder (not shown). Further, electrode 1 may optionally include a carbon-based sublayer (not shown) between catalyst layer 2 and fluid diffusion layer 3. Such a sublayer may also contain a carbon (for example, graphite or carbon black), ionomer, and/or PTFE. The techniques for applying such sublayers are known in the art and may involve the use of pore forming agents (for example, methyl cellulose).

The fluid diffusion layer is highly porous so that fluid reactant can readily pass through the fluid diffusion layer and access the catalyst layer and so that by-products can be readily removed. Preferably, the fluid diffusion layer is greater than about 50% porous and shows a Gurley air permeability of about 20 seconds or less (as measured by a Gurley densitometer in which 300 $cm^2$ of air is passed through a layer 2 area of 0.1 in (0.65 $cm^2$) using a 5 ounce (1.39 Joules/meter) force).

To keep ohmic losses within the fuel cell at an acceptable level, the through-plane resistance of the fluid diffusion layer is preferably less than about 20 m$\Omega$ per $cm^2$ under the mechanical load within a solid polymer electrolyte fuel cell stack (approximately 85 psi (586 kPa)). For layers of the order of 200 micrometers in thickness, this corresponds to layer conductivities preferably more than about 1 (ohm-cm)$^{-1}$.

The fluid diffusion layer is also preferably fabricated using a continuous process. The fluid diffusion layer preferably has a stiffness of more than 2 Taber units, and preferably more than 8 Taber units, for dimensional and mechanical stability. (Taber measurements are commonly employed in the paper industry and are indicative of a web's resistance to bending. Herein, the Taber units are determined according to standard test method ASTM D5342-95.)

Porous non-woven carbon fiber mat 7 can be conventionally obtained in rolls of continuous web (for example, the aforementioned Technical Fibre Products Ltd. carbon mats) and may be used as a porous carbonaceous web. Such mats may have the desired dimensions, porosity, and chemical resistance needed for use in fuel cell electrodes, but typically do not have sufficient stiffness or electrical conductivity. Several of these characteristics can however be improved by adding conductive filler (particulate or non-particulate carbon) and by coating the mat(s) with a carbonizable polymer having pyrrolidone functionality followed by carbonization, without unduly affecting air permeability.

In FIG. 1, filler 8 and PVP are applied to mat 7 using a conventional coating method (for example, a knife coater) and using an aqueous mixture that includes filler 8 and an aqueous solution of PVP. The mixture may optionally contain a pore former (for example, methyl cellulose) that vaporizes when heated for purposes of controlling the pore structure to some extent during the subsequent heat treatments. The amounts of filler 8 and PVP in the mixture and the amount of coating applied to mat 7 are adjusted in accordance with the desired characteristics of mat 7 and with the desired mixture properties for the given coating method. Typically, a dry fill weight in the range of approximately 1–15 mg/$cm^2$ of graphite filler and PVP is added to mat 7. In general, a high molecular weight PVP is used in order to increase the concentration of carbon in the mixture and thereby reduce the loss of material during oxidation and carbonization. Typically, a sufficient amount of PVP can be solvated in the mixture such that both the desired amount of PVP and the desired amount of filler can be incorporated into mat 7 at the same time. Graphite is a preferred choice of filler 8 since graphitic carbon has a relatively high conductivity. An appropriate graphite particle size is selected such that pores in mat 7 are not unduly blocked yet such that the particles remain supported to some extent in mat 7.

After coating, the carrier solvent is dried off. The coated mat 7 is then preferably subjected to an oxidation treatment to stabilize the coated mat containing PVP and thus maintain a higher carbon yield following carbonization. A typical oxidation treatment involves baking the PVP for about an hour in air in the range of 200° C. to 300° C. Alternatively, other equivalent oxidation treatments may be performed instead while still achieving effective stabilization of the PVP polymer. For instance, significantly shorter treatment times might be used with higher temperatures (for example, above 420° C.), or other means of oxidation might be used. Finally, the stabilized PVP in mat 7 is carbonized by heating to temperatures of about 600° C. or greater, preferably about 1000° C. or greater, for up to approximately 1 hour, thereby completing the preparation of fluid diffusion layer 3. Generally, fluid diffusion layer 3 has an area weight of less than 100 g/$m^2$. During oxidation and subsequent carbonization, a certain portion of the impregnated material is removed. Without a suitable oxidizing step to stabilize the PVP, generally most of the impregnated polymer would be volatilized during carbonization.

Those skilled in the art will appreciate that various properties of fluid diffusion layer 3 (including pore structure, wettability, and other mechanical or electrical properties) can be controlled to a certain extent by varying the type of carbon mat 7 and/or by varying the amounts of filler 8 and polymer having pyrrolidone functionality. Additionally, the properties of fluid diffusion layer 3 may be varied somewhat in the thickness direction by applying multiple applications of filler and PVP onto mat 7 using mixtures of varied composition.

Those skilled in art will also appreciate that the various properties of fluid diffusion layer 3 (including pore structure, wettability, and other mechanical or electrical properties) can be controlled by varying the type of porous carbonaceous webs employed.

Under some circumstances, it may be preferable to employ a fluid diffusion layer comprising a plurality of carbonaceous webs. As shown herein, a thicker and more porous fluid diffusion layer with better mechanical properties can be obtained using at least two carbon fiber mats impregnated with and bound together by the carbonization product of a polymer containing pyrrolidone functionality. For instance, fluid diffusion layers for use in a fuel cell electrode can be made which include at least two carbon fiber mats impregnated with and bound together by the carbonization product of a pyrrolidone polymer.

One embodiment of the process involves applying a coating of a carbonizable polymer having pyrrolidone functionality, with or without electrically conductive fillers or other additives present in the coating, between two carbon fiber mats, compacting the carbon fiber mats together, removing any release films (before or after drying), and carbonizing the polymer impregnated in the mats to produce a fluid diffusion layer for a fuel cell electrode. For example, one carbon fiber mat is coated with an ink coating comprising PVP, electrically conductive filler, and a pore former, and another carbon fiber mat is placed on top of the ink coating, then the two mats are compacted to "sandwich" the ink coating therebetween. Thereafter, the "sandwich" is subjected to a temperature above about 600° C. in an inert atmosphere so that the PVP is carbonized. Preferably, the PVP is stabilized before carbonization.

In the resultant fluid diffusion layer, the two carbon fiber mats are bound together by the carbonization product. The carbonization product may be uniformly distributed through both mats or may be mostly uniformly distributed in the mats. One skilled in the art will also appreciate that the carbonization product may be distributed in an uneven manner, so long as it binds the carbon fiber mats together.

For example, the carbonization product may be mostly disposed at the interface of the webs. One skilled in the art will also appreciate that a sub-layer may be added to a side of the carbon fiber mat before or after heat treatment. The porous carbonaceous webs may be two different materials and/or have different structures.

The carbonizable polymer having pyrrolidone functionality can be applied to the porous carbonaceous webs by methods other than the sandwich method. Other coating and mat combinations are facilitated by employing compaction to distribute the polymer and any other additives throughout the webs. Although alternative methods may be employed, the sandwich method is preferred.

Another embodiment of the present fluid diffusion layers comprises a porous carbonaceous web, a non-particulate carbon filler, and a carbonization product of a polymer having pyrrolidone functionality that binds the filler to the web. The fluid diffusion layer may be made by coating at least one porous carbonaceous web with a carbonizable polymer having pyrrolidone functionality and non-particulate carbon filler, such as chopped carbon fibers. Chopped carbon fibers can be applied to a carbon fiber mat as part of an ink coating containing the carbonizable polymer having pyrrolidone functionality. Alternatively, chopped carbon fibers can be applied directly to the surface of the carbon fiber mat and then covered with the ink coating. Thereafter, the carbonizable polymer having pyrrolidone functionality is carbonized, preferably after being stabilized.

The carbonization product may be uniformly, mostly uniformly distributed, or non-uniformly distributed. If the chopped carbon fibers and ink coating are added together, a compaction step is optional. If the chopped carbon fibers are added separately from the ink coating, a compaction step is especially desirable. Compaction tends to distribute the ink coating through the web. Both embodiments work well because following the heat treatment, the polymer having pyrrolidone functionality is carbonized to mechanically hold the materials together in a porous and conductive matrix.

Non-particulate carbon filler of several diameters, lengths and materials can be used. For instance, more than one type of fiber length can be used to substantially vary pore structure in the x–y direction. Alternatively, a substantial amount of carbon fibers may be oriented in the fluid diffusion layer so as to vary structure in the z-direction or to obtain desired properties (for example, improved through-plane conductivity).

Before the carbon fiber mats are bound together, each can have a unique coating to incorporate a z-directional structure of particle fill or carbonized binder. Further, any or each carbon fiber mat or chopped carbon fibers used may have a previous coating of binder, graphite and/or carbon, and additives before being combined and heat-treated to form the fluid diffusion layer.

The advantages of the disclosed methods include simple processing steps to incorporate a high and varied degree of z-direction asymmetric properties in a fluid diffusion layer substrate. This method allows two or more different carbon fiber mats and/or chopped carbon fiber filler to be utilized to form a thicker, more porous fluid diffusion layer which is structurally stable. Further, these methods permit better penetration and uniform distribution of filler and other additives into the fluid diffusion layer substrate.

Prior to carbonization the coated carbon fiber mats of any of these embodiments can be allowed to dry with one or more release materials. The release material may be any substance that is capable of forming a backing for a carbonaceous web during application, compaction and/or heating, yet remains easily removable such as by peeling. The release material can be used to form a release material/impregnant/web sandwich before the sandwich is subjected to other processing steps. Suitable release materials include Mylar™, Channeled Resources Blue R/L 41113 release film, and polyethylene coated paper. The release material is removed prior to carbonizing.

The fabrication of electrode 1 may be completed by applying catalyst in a conventional manner to fluid diffusion layer 3 to form catalyst layer 2. Preferably, a catalyst mixture would be applied, such as a catalyst mixture comprising catalyst particles 4 along with ionomer 5 and PTFE binder 6.

An alternative sequence may be employed however in making electrode 1. For instance, a catalyst may be applied to a mat that has been coated and filled, but prior to the carbonization step. This may offer certain advantages in that the presence of conventional reduced catalyst can promote carbonization and thus lower the temperature (and hence energy) for carbonization of the polymer having pyrrolidone functionality. Alternatively, catalyst particles may be applied in unreduced form to a coated, filled mat prior to the carbonization step. The reduction of the catalyst particles could then take place concurrently with the carbonization of the polymer having pyrrolidone functionality, thereby obviating the usual reduction step performed in the preparation of catalyst particles. An ionomer and/or a binder, if desirable, can be added after the carbonization step.

The present methods may be used to produce a fluid diffusion layer having fluid distribution channels. A fluid diffusion layer having a sufficient thickness can be embossed to form fluid distribution channels. A thicker fluid diffusion layer can be prepared in several ways. For instance, a thicker fluid diffusion layer can be prepared by using a thicker carbon fiber mat. More preferably, a thicker fluid diffusion layer comprises at least two carbon fiber mats bound together with a carbonization product of a polymer having pyrrolidone functionality, which may be prepared by the foregoing methods described herein. A thicker fluid diffusion layer can also comprise non-particulate carbon filler such as chopped carbon fibers bound to a porous carbonaceous web with a carbonization product of a polymer having pyrrolidone functionality. A fluid diffusion layer made using these thicker mats is then embossed to form fluid distribution channels. The fluid diffusion layer having a flow field is then further processed and incorporated into an MEA as previously described.

Alternatively, a fluid diffusion layer may be prepared by a process which is similar to the method disclosed in U.S. Pat. No. 6,037,073 except that the aqueous pyrrolidone solutions contemplated herein replace the phenolic resin used therein.

The following examples have been included to illustrate different embodiments and aspects of the invention but these should not be construed as limiting in any way.

EXAMPLES

Comparative Example 1

Product number 20352 non-woven carbon fiber mat from Technical Fibre Products Limited is composed of non-woven RK-30 carbon fibers that are held together by means of a styrene-acrylic binder (approximately 15% by weight). The mat has a weight per unit area of 17 $g/m^2$ and is approximately 200 micrometers thick. The Gurley air permeability was determined to be about 2 seconds (using 300 cm² of air and 5 ounces (1.39 Joules/meter) of force over an area of 0.1 in² (0.65 cm²). The through-plane resistance was determined to be about 410 mΩ per cm² area (using a fixture applying 85 psi (586 kPa) to the mat) which corresponds to a conductivity of about 0.05 (ohm-cm)$^{-1}$. The Taber stiffness in the machine (processing) direction of the mat was about 2 Taber units.

As is, this carbon fiber mat is sufficiently thin, lightweight, and permeable for use in solid polymer electrode fluid diffusion layers. However, it is preferable that the electrical conductivity and stiffness are increased.

Comparative Example 2

The non-woven carbon fiber mat of Comparative Example 1 was then impregnated with a conductive filler and carbonized phenol-formaldehyde impregnant using conventional methods. Initially, the mat was impregnated with an aqueous mixture of a conductive filler (A99 grade synthetic graphite from Asbury with a particle size in the range from 20–44 micrometers in diameter) and a pore former (86000 MW methyl cellulose). The mixture was 15% solids by weight (89% graphite, 11% methyl cellulose) and was prepared by mixing appropriate amounts of aqueous methyl cellulose solution (2% by weight), graphite, and water followed by shear mixing with a Silverson mixer at 5500 rpm for 15 minutes. The mixture was then applied to one side of the carbon fiber mat using a knife coater and air dried at ambient temperature. The other side of the carbon fiber mat was then coated with the same mixture in a like manner. The resulting filled mat contained about 4 mg/cm² of graphite/methylcellulose solids. The filled mat was then immersed in an aqueous solution containing about 21% by weight phenol-formaldehyde resin (Durite AL-5801A grade of Borden Chemicals), drained of excess solution, and then dried in air at 100° C. for about a minute. The resin was then cured by heating the resin impregnated, filled mat in an oven at 300° C. for about an hour. The resin loading in the mat was determined to be 28% by weight. The resin impregnated, filled mat was then carbonized by heating at 1000° C. under nitrogen for an hour.

The physical characteristics of the mat were then remeasured. The Gurley air permeability was about 6 seconds, the conductivity was about 2.7 (ohm-cm)$^{-1}$, and the Taber stiffness in the machine direction was greater than about 10 Taber units.

The carbon fiber mat impregnated with conductive filler and carbonized phenol-formaldehyde resin polymer in a conventional manner exhibits desirable electrical conductivity and stiffness for use in fluid diffusion layers. The air permeability has been reduced, but is still acceptable.

Inventive Example 1

Several samples of non-woven carbon fiber mat were impregnated with a conductive filler and carbonized polymer impregnant as in Comparative Example 2, except that polyvinylpyrrolidone (PVP) polymer was used and the polymer and filler were impregnated in a single step.

In this example, an aqueous mixture comprising PVP in solution and graphite in suspension was knife coated onto each side of the carbon fiber mat samples and air dried as before. The mixture contained 33% by weight of graphite and PVP, of which 75% was graphite and 25% was PVP. The weight of the solids in the coating was about 12 mg/cm². The PVP in the samples was then stabilized to different degrees by oxidizing in air at various temperatures in a convection oven for an hour. The graphite-filled, PVP impregnated mats were then carbonized at 1000° C. under nitrogen for an hour. The physical characteristics of the samples were determined and are summarized in Table 1 below. However, one sample was prepared without any stabilizing step prior to carbonization. The PVP in this sample vaporized, leaving the filler effectively unbound to the mat. The characteristics of this sample were not determined.

TABLE 1

| Oxidation temperature (° C.) | Through-plane conductivity (ohm-cm)$^{-1}$ | Gurley permeability (seconds) | Taber units (average in machine direction) |
|---|---|---|---|
| 200 | 4.1 | 11.4 | 4.2 |
| 250 | 3.2 | 6.6 | 8.1 |
| 300 | 3.3 | 10.0 | 1.5 |
| 350 | 3.3 | 8.6 | 2.1 |

By impregnating with conductive filler and carbonized PVP, the carbon fiber mats can have the characteristics desired for use in fluid diffusion layers. However, the results obtained are influenced by the oxidation process employed. Advantageously, both filler and PVP polymer can be impregnated into the mat in a single step. Further, the aqueous PVP/graphite mixture employed contains no toxic uncured resin.

Inventive Example 2

Several samples of non-woven carbon fiber mat were impregnated in a like manner to those of Inventive Example 1 except that methyl cellulose was also used in the mixture and shorter oxidation periods were used. The methyl cellulose acted to stabilize the graphite suspension and improve coating quality and acted as a pore former. Shorter oxidation periods are preferred in mass production.

In this example, an aqueous mixture containing 10% PVP, 11% graphite, and 1% methyl cellulose by weight in water was employed. The applied weight of solids mixture (after air drying) to the samples was about 6 mg/cm². Samples were again oxidized at various temperatures but this time by passing the samples through a convection oven over a period of 10 minutes. The convection oven in this case simulated a conveyor oven suitable for a mass production process. The samples were then carbonized at 1000° C. under nitrogen for an hour.

The first sample was prepared by oxidizing at 255° C. prior to carbonization. The PVP in this sample appeared to be lost after the carbonizing step, so higher oxidation temperatures were used subsequently. The physical characteristics of these subsequent samples after carbonization were determined and are summarized in Table 2 below. (This example was primarily for purposes of determining mechanical stability and electrical conductivity. Gurley air permeability values were not measured.)

TABLE 2

| Oxidation temperature (° C.) | Through-plane conductivity (ohm-cm)$^{-1}$ | Taber units (average in machine direction) |
|---|---|---|
| 350 | 2.3 | 5.4 (cracked) |
| 375 | 2.4 | 8.8 |
| 400 | 2.2 | 5.3 |
| 415 | 2.7 | 4.5 |

By impregnating with conductive filler and carbonized PVP, the carbon fiber mats can have the characteristics desired for use in fluid diffusion layers. Again, the results obtained are influenced by the oxidation process employed. Advantageously, some or all desired components can be impregnated into the mat in a single step. Further, the process appears amenable to mass production techniques.

Subsequent to these tests, an additional sample was oxidized at 375° C. for ten minutes and then carbonized more rapidly in a conveyor oven using nitrogen gas blankets on either side of the heat treatment zone. This sample was carbonized at 1000° C. but only for approximately 6 minutes. The through-plane conductivity, Taber stiffness, and Gurley air permeability for this sample were 2.1 (ohm-cm)$^{-1}$, 8.0 Taber units, and 12.8 seconds respectively. This data suggests that the fluid diffusion layer properties are less sensitive to the carbonization process than the oxidation process.

Inventive Example 3

A fluid diffusion layer was prepared by laminating two 17 g/m$^2$ TFP carbon fiber mats together using the carbonization product of an ink containing polyvinlypyrrolidone. An aqueous ink comprising 8.9% polyvinylpyrrolidone resin, 11.1% graphite particles, and 0.89% methyl cellulose by weight in water was employed. The ink was knife coated onto one of the carbon fiber mats to form a coating. The second carbon fiber mat was placed on top of the ink coating to form a "sandwich," which was then compacted at a pressure of 80 psi. The PVP was then stabilized by oxidizing in air at a temperature of 250° C. for 1 hour. The sandwich was then carbonized at 1000° C. under nitrogen for an hour. No loose fibers were observed on the surfaces of the fluid diffusion layers (unlike from single, thicker carbon fiber mats). Porosity (calculated basis weight/thickness) was greater than substrates of the same thickness obtained from a single carbon fiber mat with a greater amount of carbonization product impregnated therein.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. A method of making a fluid diffusion layer for a fuel cell electrode including impregnating a porous carbonaceous web with a polymer and carbonizing said polymer, said method characterized in that said polymer has pyrrolidone functionality.

2. The method of claim 1 wherein said polymer is polyvinylpyrrolidone.

3. The method of claim 1 wherein said polymer is dissolved in a solvent to form a solution, said solution being applied to said carbonaceous web.

4. The method of claim 3 wherein said solvent is water.

5. The method of claim 4 wherein said solution further comprises at least one conductive filler.

6. The method of claim 5 wherein said at least one conductive filler comprises graphite particles.

7. The method of claim 2 further comprising heating said polymer in an oxidizing atmosphere at a temperature below about 420° C. before carbonizing.

8. The method of claim 1 wherein the carbonizing is performed in an inert atmosphere at a temperature above about 600° C.

9. The method of claim 1 wherein said fluid diffusion layer is a gas diffusion layer.

10. The method of claim 1 wherein said fluid diffusion layer is suitable for use in a solid polymer electrolyte fuel cell electrode.

11. The method of claim 1 wherein said porous carbonaceous web is a non-woven carbon fiber mat comprising carbon fibers and a binder.

12. The method of claim 11 wherein said binder is a styrene-acrylic binder.

13. The method of claim 11 wherein said binder comprises a polymer having pyrrolidone functionality.

14. The method of claim 1 additionally comprising applying a catalyst to said fluid diffusion layer before carbonizing.

15. The method of claim 14 wherein a catalyst mixture of said catalyst and said polymer is applied to said fluid diffusion layer before carbonizing.

16. The method of claim 1 wherein said web is greater than about 80% porous.

17. The method of claim 1 wherein said web is less than about 250 micrometers thick.

18. The method of claim 1 wherein said web has a weight per unit area less than about 100 g/m$^2$.

19. The method of claim 1 further comprising incorporating carbon particles into said web.

20. The method of claim 19 wherein said carbon particles comprise graphite.

21. The method of claim 19 comprising incorporating a fill mixture of said carbon particles and said polymer into said web.

22. The method of claim 21 wherein said fill mixture comprises a pore former.

23. The method of claim 22 wherein said pore former is methyl cellulose.

24. The method of claim 1 wherein said web is stiffened such that the Taber stiffness is greater than 2 Taber units.

25. The method of claim 1 wherein the electrical conductivity of said web is increased to be greater than about 1 (ohm-cm)$^{-1}$.

26. The method of claim 1 wherein the Gurley air permeability of said web is less than about 20 seconds.

27. A method of making a fluid diffusion layer for a fuel cell electrode, the method comprising the steps of:
(a) impregnating a plurality of porous carbonaceous webs with a carbonizable polymer having pyrrolidone functionality;
(b) carbonizing the polymer so that the plurality of webs are bound together by a carbonization product.

28. The method of claim 27 wherein the plurality of webs comprises a first web and a second web, and the method comprises applying an ink comprising the carbonizable polymer so that the polymer is disposed between the first web and the second web.

29. The method of claim 28 wherein the ink is applied directly to the first web only, and then the second web is contacted with the carbonizable polymer applied to the first web.

30. The method of claim 27 wherein the webs and the carbonizable polymer are compacted before the carbonizing step.

31. The method of claim 27 wherein the carbonizable polymer impregnating the webs is stabilized before carbonization.

32. The method of claim 27 wherein the plurality of webs comprises a first web and a second web, and the first web comprises a different material than the second web.

33. The method of claim 27 wherein the plurality of webs comprises a first web and a second web, and the first web has a different structure then the second web.

34. A method of making a fluid diffusion layer for a fuel cell electrode, the method comprising the steps of:
   (a) coating a porous carbonaceous web with a mixture comprising a polymer having pyrrolidone functionality;
   (b) disposing a non-particulate carbon filler in the coating of polymer; and
   (c) carbonizing the polymer so that the carbonization product binds the non-particulate carbon filler to the web.

35. The method of claim 34 wherein the non-particulate carbon filler comprises chopped carbon fibers.

36. The method of claim 34 wherein the non-particulate carbon filler is disposed in the polymer before the carbonaceous web is coated with the mixture.

37. The method of claim 34 wherein the non-particulate carbon filler is disposed on the carbonaceous web before the carbonaceous web is coated with the polymer.

38. A method of making a fluid diffusion layer defining a flow field for a fuel cell electrode, the fluid diffusion layer comprising at least one porous carbonaceous web, the method comprising the steps of:
   (a) impregnating at least one porous carbonaceous web with a polymer having pyrrolidone functionality,
   (b) carbonizing the polymer having pyrrolidone functionality to form a carbonization product, thereby forming a fluid diffusion layer having first and second major surfaces; and
   (c) forming at least one fluid distribution channel on the first major surface of the fluid diffusion layer.

39. The method of claim 38 wherein the at least one fluid distribution channel is formed by embossing the fluid diffusion layer.

40. The method of claim 38 wherein the fluid diffusion layer comprises a plurality of carbonaceous webs.

41. The method of claim 38 further comprising disposing a non-particulate carbon filler in the polymer before the carbonizing step.

42. The method of claim 41 wherein the non-particulate carbon filler comprises chopped carbon fibers.

* * * * *

UNITED STATES PATENT AND TRADEMARK OFFICE
CERTIFICATE OF CORRECTION

PATENT NO. : 6,667,127 B2
DATED : December 23, 2003
INVENTOR(S) : Paul D. Beattie et al.

It is certified that error appears in the above-identified patent and that said Letters Patent is hereby corrected as shown below:

Title page,
Item [56], References Cited, U.S. PATENT DOCUMENTS, add:
-- 5,879,417 A   3/1999   Yamada et al. ................429/40 --.
FOREIGN PATENT DOCUMENTS, add:
-- EP    0 286 945      10/1988
   JP    0 697 747      2/1996 --.

Column 7,
Line 8, after the word "layer", delete "2".
Line 8, change "0.1 in." to -- 0.1 in.$^2$ --.

Column 10,
Line 7, after "Mylar", change "$^{TM}$" to -- ® --.

Column 14,
Line 9, change "Th e" to -- The --.

Signed and Sealed this

Twenty-second Day of February, 2005

JON W. DUDAS
*Director of the United States Patent and Trademark Office*